United States Patent [19]

Demiryont

[11] Patent Number: 4,923,289
[45] Date of Patent: May 8, 1990

[54] ELECTROCHROMIC DEVICES HAVING A GRADIENT OF COLOR INTENSITIES

[75] Inventor: Hulya Demiryont, Dearborn, Mich.

[73] Assignee: Ford Motor Company, Dearborn, Mich.

[21] Appl. No.: 253,457

[22] Filed: Oct. 5, 1988

[51] Int. Cl.⁵ .............................................. G02F 1/17
[52] U.S. Cl. ................................................... 350/357
[58] Field of Search ............... 350/357, 353, 355, 356; 347/785

[56] References Cited

U.S. PATENT DOCUMENTS

| 3,578,843 | 5/1971 | Castellion | 350/357 |
| 4,529,275 | 7/1985 | Ballmer | 350/357 |
| 4,728,177 | 3/1988 | Green | 350/357 |
| 4,832,468 | 5/1989 | Ito et al. | 350/357 |

FOREIGN PATENT DOCUMENTS 0184129 10/1983 Japan .................. 350/357

Primary Examiner—Eugene R. LaRoche
Assistant Examiner—Nathan W. McCutcheon
Attorney, Agent, or Firm—Lorraine S. Melotik; Roger L. May

[57] ABSTRACT

This invention is directed to electrochromic devices having a color intensity gradient. Specifically the electrochromic device comprises two substrates and therebetween: one electrode layer; an electrochromic layer; an ion conductive material; and another electrode layer in that order. At least one of the electrode layers is transparent and each electrode layer is in contact with a respective one of the substrates. The ion conductive layer is adapted to communicate ions to and from the electrochromic material upon the application of a voltage across the electrode layers. The electrochromic material has a continuously decreasing thickness gradient in at least one region when measured normal to the plane of an electrode layer.

16 Claims, 1 Drawing Sheet

ELECTROCHROMIC DEVICES HAVING A GRADIENT OF COLOR INTENSITIES

FIELD OF THE INVENTION

The present invention relates to electrochromic devices which exhibit coloration and bleaching thereof at ambient temperature by control of the polarity of an induced electric field. More particularly, this invention relates to a method for providing an electrochromic device with a gradient of color, i.e., color of different intensity in different regions thereof.

BACKGROUND OF THE INVENTION

Electrochromic devices are devices in which a physical/chemical change produced in response to the induced electric field results in a change in the reflective (or transmissive properties) of the device with respect to electromagnetic radiations, e.g., uv, IR, and visible radiation. Such devices, one embodiment being shown as item 10 in FIG. 1, generally comprise a film of electrochromic material 12 and an ion-conductive insulating layer 14 which functions as an electrolyte layer. The film and the electrolyte layer are in surface contact with each other for exchange of ions between the electrochromic film and the electrolyte layer. Two conductive electrode layers, 16 and 18 in FIG. 1, at least one of them being transparent, are disposed on the opposite outer surfaces of the film and the electrolyte layer to provide means for applying a voltage across the combined thickness of the electrochromic film and the electrolyte layer. The electrode layers, 16 and 18 in FIG. 1, are provided on substrates, 20 and 22 of FIG. 1, which substrates may be of a material such as glass. Depending on the ion providing and ion storage capacity of ion conductive layer 16, a counter electrode located between ion conductive layer 14 and electrode layer 18 may be used. The electrodes are provided with external electrical leads 24 and 26 connected to a voltage providing source 28. Application of a voltage of proper polarity across the electrodes causes coloration of the electrochromic layer. By reversing the polarity of the applied voltage, the colored electrochromic layer will be uncolored (bleached). Changing from the bleached state to the colorless state or from the colored state to the bleached is termed "switching". The electrochromic material may be persistent in either its colored state or its non-colored state. By "persistent" is meant the ability of the material to remain, after removal of the electric field, in the absorptive state to which it is changed, as distinguished from a substantially instantaneous reversion to the initial state. The length of time a material is persistent is called its "open circuit memory" or simply "memory". In some embodiments, the coloration can be erased by simply short circuiting the electrodes through an external circuit, there being enough internally stored charge to supply the reversed voltage required to raise the coloration in electrochromic layer. Electrochromic devices of this type have been described for several uses, such as image display, for light filtering, etc. See, e.g., U.S. Pat. Nos. 3,708,220, 4,194,812; 4,278,329; 4,645,308; 4,436,769; 4,500,878; 4,150,879; 4,652,090; 4,505,021; and 4,664,934.

In such devices, the electrochromic film usually comprises an inorganic metal oxide material, most commonly a transition metal oxide, in particular: tungsten oxide. When tungsten oxide is the electrochromic material, the electrolyte layer is adapted to provide a positively charged light cation, preferably, a proton or a lithium ion. The electrolyte layer is generally a liquid electrolyte solution which comprises polymers or copolymers containing acidic groups such as polystyrene sulfonic acid or a solid compound like lithium chloride. The electrolyte layer also may be a gel like polyvinyl butyral-methanol doped with LiCl.

It would be desirable in some situations to have an electrochromic display device which exibits gradations of color intensity in different regions of the device during operation of the device, for example, to provide a monochromatic "picture" based on the same color but different intensities thereof. It would further be desirable to provide an electrochromic device having a gradient band of coloration, e.g., a more intense coloration in a lower region as compared to its upper region. Such a device could find use as walls of an office that could be switched from the colorless state to a graded colored state at will to provide privacy. It could eliminate the combined glass wall/venetian blind combination often used in offices today. Advantageously it would be easier to keep clean. It further will be appreciated that it might be desirable to have an electrochromic device which includes a gradient band in which the upper portion is more intensely colored than the lower region. Such a device might be useful as the windshield of an automobile, for the windows or buildings or for sunglasses. Ballmer in U.S. Pat. No. 4,529,275 teaches that normal eyeglasses can be used as sunglasses by forming such glasses as electrochromic devices using different contact-electrode techniques to color an eyeglass lens more strongly in the upper region than in the lower regions. According to Ballmer doing so would produce so-called automobile driver's sunglasses, in which an instrument panel is more readily observed through the less colored part of the lenses.

It is not well ascertained how Ballmer means to provide the color gradient but according to his teachings it is related to contact with the electrodes. It appears to suggest providing an electrical field gradient to be induced by limiting the surface conductivity of the electrodes. Such a method would be complex and less than desirable. This patent makes no teaching or suggestion of the invention disclosed herein.

Castellion, in U.S. Pat. No. 3,578,843 directed to reflecting electrochromic devices, discloses that the depth of coloration is dependent upon the thickness of the persistent electrochromic layer. He further discloses that, in theory, it would seem that the thicker the layer, the more color centers would be formed upon application of the electric field and therefore deeper coloration could be expected. He concludes that, however, since thin layers could be expected to color more quickly in some cases, the relationship between thickness of the layers and depth of color is not simple. He makes no teaching or suggestion to provide a device having electrochromic material in a thickness gradient in in at least one region in order to provide a device with different intensities of coloration as is done in the present invention.

It would be desirable if a method could be found to provide a color gradient in an electrochromic device in a less complex and thus commercially advantageous way over that suggested by Ballmer. The invention disclosed herein provides an electrochromic device exhibiting a gradient of color in different regions of the device such as a gradient band on a windshield in a feasible way.

SUMMARY OF THE INVENTION

The present invention is directed to a method for forming regions of an electrochromic device adapted to provide a color intensity gradient during operation of the electrochromic device which comprises two substrates and therebetween: one electrode layer; an electrochromic material; an ion conductive material; and another electrode layer in that order, at least one of the one electrode layer and the other electrode layer being transparent and each electrode layer being in contact with a respective one of the substrates, the ion conductive layer being adapted to communicate ions to and from said electrochromic material upon application of a voltage across said electrode layers, which method comprises providing electrochromic material in a thickness gradient in at least one region when measured normal to the plane of an electrode layer. Preferably, the total thickness of the electrochromic material combined with the ion conductive material it contacts is substantially uniform. The thicker regions of the electrochromic material are correspondingly associated with the regions of more intense color during operation of the device. Another aspect of this invention is directed to an electrochromic device having a thickness gradient of electrochromic material according to the method described above. According to still another aspect of the invention, the electrochromic device of this invention may be coupled to an electrochromic device capable of coloration of uniform intensity during operation of the device.

Advantageously, it has been found that according to embodiments of the method of the present invention a device can be made which is capable of providing different percent reductions of radiation in different regions of the device, correspondingly providing a gradient of intensity of coloration in different regions.

DETAILED DESCRIPTION OF THE PREFERRED EMBODIMENTS

Figure 1:
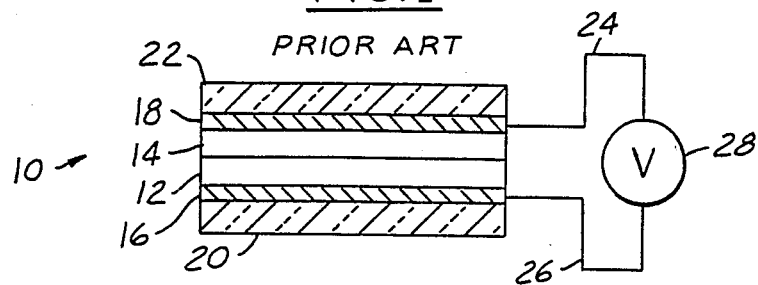
FIG. 1 is a schematic representation of an electrochromic device, in cross-section, according to the prior art.

Electrochromic devices generally comprise two substrates and therebetween one electrode layer, an electrochromic layer, an ion conductive layer, and another electrode layer. Devices of this general type are well known in the art and disclosed for example in the U.S. patents listed above.

In this invention, a method is provided for forming regions of an electrochromic device disclosed above which are gradated in color intensity during operation of the electrochromic device. As disclosed above, the method comprises providing electrochromic material in a thickness gradient in at least one region when measured normal to the plane of an electrode layer. The thicker regions of the electrochromic material being correspondingly associated with the regions of more intense color during operation of the device.

The invention will be further understood by reference to the embodiments of electrochromic devices according to this invention shown in the figures. The embodiment of this invention shown as device 30 and device 60 of of FIGS. 2 and 3, respectively, each individually comprise glass substrate 32 in contact with electrode layer 34 and glass substrate 36 in contact with transparent electrode layer 38. Devices 30 and 60 each further comprise electrochromic material 40 in contact with ion conductive material 42.

Figure 2:
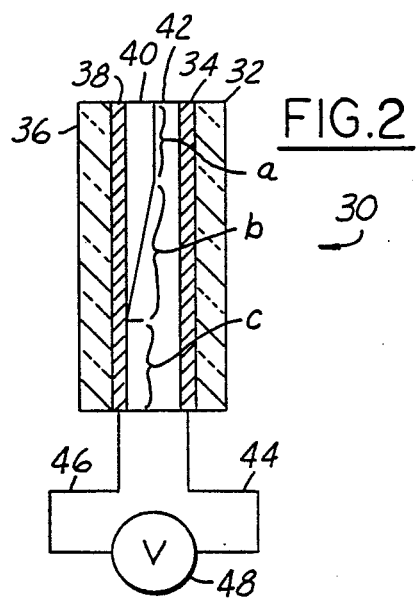
FIGS. 2 and 3 are schematic representations of an embodiment of an electrochromic device, in cross-section, according to this invention. The same numbers are used in these figures to refer to similar components thereof.
Figure 4:
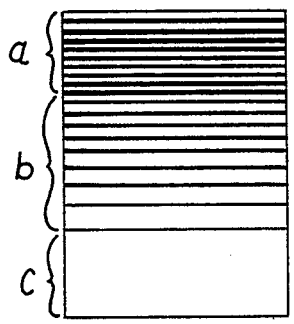
FIG. 4 illustrates an embodiment of the color patterning of the devices of FIG. 2 during its operation.

During operation of these devices, a voltage is applied across the electrodes by leads 44 and 46 connected to a voltage providing device 48. If electrochromic layer 40 comprises a cathodic electrochromic material like tungsten oxide, a voltage of negative polarity applied to electrode layer 34 would cause the electrochromic material to change from colorless to blue, i.e., from its bleached to colored state. In areas (a) and (b) of device 30, a blue color would develop throughout the electrochromic material. The intensity of color seen when viewing the device through either glass substrate would be a blue color of substantially uniform intensity in region "a" since the thickness of the electrochromic material is substantially of uniform thickness in this region. Region "b" would exhibit a color of graded intensity, the intensity of the color in region "b" decreasing with the decreasing thickness of the electrochromic material. That is, the intensity of the color would be greatest near region "a" and be least intense at the lower (thinnest) end of the electrochromic material (i.e., at the "b" and "c" junction). At the b—c junction it would be almost colorless. It would be colorless in the "c" region. Since there is no electrochromic material in the "c" region, this region would always appear colorless. That is, region "c" is a non-switchible region. This variation in coloration for the device of FIG. 2 is shown in FIG. 4. The regions designated a, b, and c in the device of FIG. 2 would have the relative intensity of coloration shown for these regions in FIG. 4 when viewing the device through one of the glass substrates.

Such a device as in FIG. 2 could be used as the windshield of a car to reduce transmittance of light. By providing the electrochromic material in a pattern as shown in FIG. 2 across the top of the windshield (or all windows of a car), a driver could control the intensity of light entering the car. On a very sunny day the driver could provide voltage to the device for a period of time to color the device to the desired intensity. On a less sunny day, the device could be colored less. The same type of device could be used to reduce transmission of radiation impinging the windows of a building, be it a home or office building. The profile of the gradient region and thickness thereof can be adjusted, e.g., according to geography to provide maximum solar efficiency.

Figure 3:
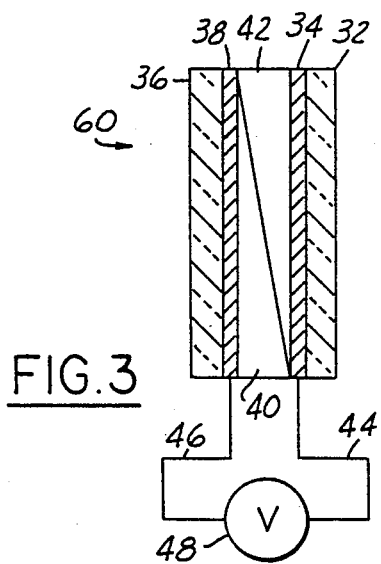

Such a device as that shown in FIGS. 2 or 3, for example, could be used "back-to-back" with a second electrochromic device of a type which has uniform intensity coloration of the entire device. In the second device, the electrochromic material would be provided in a substantially uniform layer throughout. Using the combination of these devices, for example, as the windshield of a car it would be possible to reduce transmittance of sunlight to a desired level while driving by coloring a gradient band across the top of the windshield to a desired intensity and it would also be possible to darken the entire windshield to maximum darkness after parking the car by using the second device in an effort to reflect maximum radiation in an attempt to keep the car cooler inside or provide privacy. Not only could such a combination be used as the windshield, but as all of the windows of the car and the backlite. Still further it would be advantageous to use such a combination as the windows of a home or office building. Yet another option for such a device comprises using one of the electrode layers to heat the device, so as to provide in the case of a windshield, a self-defrosting windshield.

Figure 5:
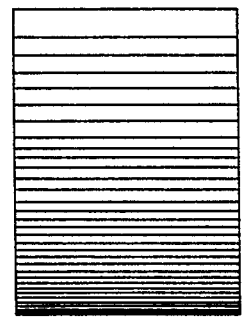
FIGS. 5 illustrates an embodiment of the color patterning of the device of FIG. 3 during its operation.

As will be apparent to those skilled in the art in view of the present disclosure, the electrochromic material may be present in any of numerous patternings as long as it comprises a variable thickness in at least some regions thereof. It may be that the thickness of the electrochromic material varies throughout the electrochromic material as shown in FIG. 3. In this figure, device 60 includes electrochromic material 40 which varies from maximum thickness at the bottom of the device to minimum thickness at the top of the device. This device would when colored exhibit a variation in color intensity which would be maximum at the bottom where the electrochromic material was the thickest and be minimum at the top where the electrochromic material is the thinnest. This relative intensity of coloration is shown in FIG. 5 and illustrates the coloration when viewing the device of FIG. 3 through normal to one of the substrates. Such a device might be useful as walls of an office when one needs privacy for a meeting. Still other uses and configuration of devices according to this invention will be apparent to those skilled in the art in view of the present disclosure.

The substrate employed in the device may comprise any material which is stable at the temperatures and under the conditions of the fabrication and use of the device. Commonly used materials for the substrates of such devices include, e.g., glass, polycarbonate, quartz, plastic, and the like and suitable combinations of any of them. At least one of the substrates will be at least translucent, and preferably transparent. Selection of the optimal material to be used for one or both substrates of the device will be apparent to one skilled in the art in view of this disclosure.

The electrodes used in the electrochromic device of this invention may be any material which, relative to the electrochromic film, is electrically conductive. At least one of the electrode-substrate combinations is transparent, although both may be. If it is intended that the electrode be a light transmitting electrode, there may be used a light transmitting film of an electrically conductive metal oxide such as doped or undoped tin oxide, indium oxide, zinc oxide and the like. The thickness of the transparent electrode layer generally falls within the range of 200 nm to several microns, correspondingly varying in transparency and resistance.

The transparent electrode layer may be formed on the substrate by any known technique, including vacuum evaporation, chemical vapor deposition, sol-gel deposition, ion plating, reactive sputtering, etc. The transparent electrode layer may be formed by the so-called thick film processes such as screen printing or coating. When the thick batch film process are used, (1) a paste containing metal compound micro particles or (2) a solution of an organic metal compound such as metal alcoholate or its oligomer is coated and sintered to form the transparent electrode layer. Preferably, the transparent electrode material is tin oxide doped with fluorine. The non-transparent electrode material selected from light-reflecting electrode materials (e.g., Al, Ag, Pt or Ni) or other electrode materials (e.g., Au, Pd, Cr, Ir, Ru, Rh or C).

The electrochromic layer may be selected from any electrochromic material, many of which are well known to those skilled in the art and commercially available. Cathodic electrochromic materials include non-stoichiometric (i.e., oxygen deficient) metal oxides wherein the metal has variable oxidation states. Exemplary of such cathodic electrochromic materials useful in this invention are those selected from the group comprising tungsten oxide, molybdenum oxide, vanadium oxide, titanium oxide, lead oxide, and bismuth oxide and compatible mixtures of any of them. Anodic electrochromic materials which may be used in this invention include full oxidized compounds comprising metal wherein the metal has variable oxidation states. Exemplary of such anodic electrochromic materials are iridium oxide, and nickel hydroxide and compatible mixtures of any of them. Preferred electrochromic materials for use in electrochromic devices of this invention include non-stoichiometric, oxygen deficient tungsten oxide as the cathodic electrochromic material and fully oxidized iridium oxide as an anodic electrochromic material.

As disclosed above, the electrochromic material of the device will comprise a thickness gradient in order to provide the gradient of intensity of coloration. It is believed herein that a colored electrochromic material exhibits metal like optical properties, such that transmitted light intensity decreases exponentially with film thickness. Thus the transmission gradient (color intensity gradient) is controlled by controlling the thickness gradient of the electrochromic material. The electrochromic material may be provided on the appropriate surface in the device, e.g., in the embodiments shown in FIGS. 2 and 3 on the electrode layer, by any suitable technique. For example, the electrochromic material may be provided by vacuum deposition, chemical vapor deposition, thermal evaporation, sputtering, sol-gel deposition, and the like. Application of a graded electrochromic film, i.e., comprising a thickness gradient, can be controlled in various ways. For example, it can be controlled by varying the distance of the deposition device to the substrate on which the electrochromic material is being applied or by tilting the substrate, since the closer the substrate to the source the thicker the applied film. Another simple technique to achieve a graded thickness of the electrochromic material is to use a substrate which moves with a varying velocity or a mask which moves relative the substrate. Still other techniques for depositing a film of variable thickness will be apparent to those skilled in the art in view of the present disclosure. Usually the thickness of the electrochromic layer is between about 0.1 and 100 microns. Optimal thickness also will be determined by the material of the film. Selection of the optimal electrochromic material and method of its deposition will be apparent to those skilled in the art in view of the present disclosure.

The ion conductive layer can be said to comprise an ion source means for providing ions into the electrochromic material upon application of a voltage across the electrode layers. The ion conductive layer (often referred to as the electrolyte) can be selected from a number of materials. Exemplary of dielectric materials useful as the ion conductive layer are tantalum oxide ($Ta_2O_5$), niobium oxide ($Nb_2O_5$), zirconium oxide ($ZrO_2$), titanium oxide ($TiO_2$), hafnium oxide ($HfO_2$), alumina ($Al_2O_3$), yttrium oxide ($Y_2O_3$), lanthanum oxide ($La_2O_3$), silicon oxide ($SiO_2$), magnesium fluoride, zirconium phosphate, or a mixture thereof (a thin film of such a dielectric material serves as an insulator for electrons but as a conductor for protons ($H^+$) and hydroxy ions ($OH^-$)). It is known that the ion conductive layer is adapted to contain ions or include an ion source for emitting ions upon application of a voltage. Exemplary of solid electrolytes useful as the ion conductive layer are sodium chloride, potassium chloride, sodium bromide, potassium bromide, $Na_3Zr_2Si_2PO_{12}$, $Na_{1+x}ZrSi_xP_{3-x}O_{12}$, $Na_5YSi_4O_{12}$, or $RbAg_4I_5$. The ion conductive layer may also be a water or proton source-containing synthetic resin copolymer of $\phi$-hydroxyethyl methacrylate with 2-acrylamide-2-methylpropane sulfonic acid, a hydrate vinyl copolymer (e.g., a hydrate methyl methacrylate copolymer), or a hydrate polyester. The ion conductive layer also can be an electrolytic solution of an acid (e.g., sulfuric acid, hydrochloric acid, phosphoric acid, acetic acid, butyric acid, or oxalic acid) or an aqueous solution thereof, an aqueous solution of an alkali (e.g., sodium hydroxide or lithium hydroxide), or an aqueous solution of a solid strong electrolyte (e.g., sodium hydroxide, lithium chloride, potassium chloride, or lithium sulfide. Exemplary of semi-solid gel electrolytes useful as the ion conductive layer are those, for example, obtained by gelling an electrolytic aqueous solution with a gelling agent (e.g., polyvinyl alcohol, CMC, agar-agar or gelatin). Preferably, the ion conductive layer is selected from a material which comprised alkali metal compounds. Most preferably, such compounds are selected from nitrate salts and chloride salts of alkali metal compounds. The alkali metal in such compounds are preferably selected from lithium, potassium and sodium. Selection of the optimal ion conductive material would be apparent to one skilled in the art in view of this disclosure. As is known to those skilled in the art, the thickness of the ion conductive layer may vary, optimal thickness being dependent on such considerations as desired maximum intensity of the color, type of ion conductive material, configuration of the device, etc.

In the embodiments of the devices shown in FIG. 2 and 3, the devices could be formed by applying electrode 34 on substrate 32 upon which is deposited electrochromic layer 40. In such a situation, the electrochromic material 40 could be provided on electrode layer 34 by any suitable technique, the thickness of the electrochromic material in different regions therof being provided as described above. Thereafter, the ion conductive material 42, if it were a solid or gel, could be provided as shown in FIGS. 2 and 3 in such thickness so that the total thickness (when taken normal to the surface of electrode layer 34) of the electrochromic material and ion conductive material is substantially the same. If on the other hand it was desired to use a liquid ion conductive material, the device would be assembled as shown in FIGS. 2 and 3 by sealing three of the edges of the device with a material like silicone or epoxy. The cavity formed in the device in this way could then be filled with a liquid ion conductive material.

As would be apparent to those skilled in the art in view of the present disclosure, the method of this invention is applicable to any electrochromic device. Such devices may comprise other components, e.g., counter electrodes, a second electrochromic layer, etc.. Counter electrodes are generally employed between the ion conductive layer and an electrode of the device (i.e., between ion conductive material 42 and electrode layer 46 of the device of FIGS. 2 or 3) to improve operation of the device. A counter electrode may be formed of, e.g., $WO_3$ doped with and alkali metal ion. This material is generally not meant to be electrochromic.

In view of the disclosure, many modifications of this invention will be apparent to those skilled in the art. It is intended that all such modifications which fall within the true scope of this invention be included within the terms of the appended claims.

I claim:

1. A method for forming regions of an electrochromic device adapted to provide a color intensity gradient during operation of said electrochromic device which comprises two substrates and therebetween: one electrode layer; an electrochromic material; an ion conductive material; and another electrode layer in that order, at least one of said one electrode layer and said other electrode layer being transparent and each electrode layer being in contact with a respective one of said substrates, said ion conductive layer being adapted to communicate ions to and from said electrochromic material upon application of a voltage across said electrode layers, which method comprises:
providing said electrochromic material in a continuously decreasing thickness gradient in at least one region when measured normal to the plane of an electrode layer.

2. The method according to claim 1, wherein the said electrochromic material is selected from tungsten oxide, molybdenum oxide, copper oxide, cobalt oxide, lead oxide, bismuth oxide, iridium oxide and nickel hydroxide.

3. The method according to claim 1, wherein said one electrode layer and said other electrode layer are individually selected from electrode material consisting essentially of doped or undoped (a) tin oxide, (b) indium oxide, (c) indium tin oxide, (d) zinc oxide, and (e) mixtures of any of them.

4. The method according to claim 1, wherein said ion conductive material is selected from materials comprising hydrogen ions and from materials comprising alkali metal compounds.

5. The method according to claim 4, wherein said alkali metal compounds are selected from compounds comprising nitrates and chlorides of alkali metals.

6. The method according to claim 1, wherein the total thickness of the electrochromic material combined with the ion conductive material it contacts is substantially uniform.

7. The method according to claim 1, wherein said step of providing said electrochromic material in a continuously decreasing thickness gradient is accomplished by varying the distance from the deposition device to the substrate on which said electrochromic material is being applied.

8. The method according to claim 1, wherein said step of providing said electrochromic material in a continuously decreasing thickness gradient is accomplished by tilting the substrate on which the electrochromic material is being applied.

9. The method according to claim 1, wherein said step of providing said electrochromic material in a continuously decreasing thickness gradient is accomplished by moving the substrate on which said electrochromic material is being applied with a varying velocity.

10. The method according to claim 1, wherein said step of providing said electrochromic material in a continuously decreasing thickness gradient is accomplished by using a mask which moves relative to the substrate on which said electrochromic material is being applied.

11. An electrochromic device which comprises two substrates and therebetween: one electrode layer; an electrochromic material; an ion conductive material; and another electrode layer in that order, at least one of said one electrode layer and said other electrode layer being transparent and each electrode layer being in contact with a respective one of said substrates, said ion conductive layer being adapted to communicate ions to and from said electrochromic material upon application of a voltage across said electrode layers, said electrochromic material being a continuously decreasing thickness gradient in at least one region when measured normal to the plane of an electrode layer.

12. The device according to claim 11, wherein the said electrochromic material is selected from tungsten oxide, molybdenum oxide, copper oxide, cobalt oxide, lead oxide, bismuth oxide, iridium oxide and nickel hydroxide.

13. The device according to claim 11, wherein said one electrode layer and said other electrode layer are individually selected from electrode material consisting essentially of doped or undoped (a) tin oxide, (b) indium oxide, (c) indium tin oxide, (d) zinc oxide, and (e) mixtures of any of them.

14. The device according to claim 11, wherein said ion conductive material is selected from materials comprising hydrogen ions and from materials comprising alkali metal compounds.

15. The device according to claim 14, wherein said alkali metal compounds are selected from compounds comprising nitrates and chlorides of alkali metals.

16. The device according to claim 11, wherein the total thickness of said electrochromic material combined with said ion conductive material it contacts being substantially uniform.

* * * * *